US012206176B2

(12) United States Patent
Compton

(10) Patent No.: US 12,206,176 B2
(45) Date of Patent: Jan. 21, 2025

(54) ELECTRONIC DEVICES HAVING BI-DIRECTIONAL DIELECTRIC RESONATOR ANTENNAS

(71) Applicant: Apple Inc., Cupertino, CA (US)

(72) Inventor: Lucas R. Compton, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 17/235,240

(22) Filed: Apr. 20, 2021

(65) Prior Publication Data

US 2022/0336965 A1 Oct. 20, 2022

(51) Int. Cl.
*H01Q 21/22* (2006.01)
*H01Q 1/24* (2006.01)
(Continued)

(52) U.S. Cl.
CPC ............ *H01Q 21/22* (2013.01); *H01Q 1/243* (2013.01); *H01Q 1/42* (2013.01); *H01Q 3/34* (2013.01); *H01Q 5/50* (2015.01)

(58) Field of Classification Search
CPC .......... H01Q 21/22; H01Q 1/243; H01Q 1/42; H01Q 3/34; H01Q 5/50; H01Q 3/26;
(Continued)

(56) References Cited

U.S. PATENT DOCUMENTS 3,680,136 A * 7/1972 Collings .............. H01Q 9/0407 343/846
4,125,837 A * 11/1978 Kaloi .................. H01Q 9/0435 343/846

(Continued)

FOREIGN PATENT DOCUMENTS

CN 102197534 A 9/2011
CN 110635228 B * 12/2020
JP 2000209020 A 7/2000

OTHER PUBLICATIONS

U.S. Appl. No. 16/851,848, filed Apr. 17, 2020.
U.S. Appl. No. 17/028,871, filed Sep. 22, 2020.
U.S. Appl. No. 17/029,599, filed Sep. 23, 2020.

*Primary Examiner* — Hoang V Nguyen
(74) *Attorney, Agent, or Firm* — Treyz Law Group, P.C.; Michael H. Lyons; Jinie M. Guihan

(57) ABSTRACT

An electronic device may have a first phased antenna array that radiates through a display and a second phased antenna array that radiates through a rear wall. The first array may include a front-facing dielectric resonator antenna and the second array may include a rear-facing dielectric resonator antenna. The front and rear-facing antennas may share a dielectric resonating element. Feed probe(s) may excite a first volume of the dielectric resonating element to radiate through the display and may excite a second volume of the dielectric resonating element to radiate through the rear wall. The dielectric resonating element may have a geometry that helps to isolate the front-facing dielectric resonator antenna from the rear-facing dielectric resonator antenna. The first and second arrays may collectively cover an entire sphere around the device while occupying a minimal amount of volume within the device.

3 Claims, 11 Drawing Sheets

(51) Int. Cl.

| | |
|---|---|
| ***H01Q 1/42*** | (2006.01) |
| ***H01Q 3/34*** | (2006.01) |
| ***H01Q 5/50*** | (2015.01) |

(58) Field of Classification Search

CPC ...... H01Q 9/0492; H01Q 21/08; H01Q 21/24; H01Q 25/005; H01Q 1/50; H01Q 1/241; H01Q 21/065; H01Q 9/0485; H04M 1/0266; H04M 1/0277

See application file for complete search history.

(56) References Cited

U.S. PATENT DOCUMENTS

| | | | | |
|---|---|---|---|---|
| 4,529,987 | A * | 7/1985 | Bhartia | H01Q 9/0421 343/745 |
| 4,751,513 | A * | 6/1988 | Daryoush | H01Q 9/145 343/700 MS |
| 6,292,141 | B1 * | 9/2001 | Lim | H01Q 5/40 343/873 |
| 6,344,833 | B1 * | 2/2002 | Lin | H01Q 21/28 343/873 |
| 6,452,565 | B1 * | 9/2002 | Kingsley | H01Q 9/0492 343/873 |
| 6,531,991 | B2 * | 3/2003 | Adachi | H01Q 9/0485 343/873 |
| 6,995,715 | B2 * | 2/2006 | Ying | H04M 1/035 343/702 |
| 7,423,591 | B2 * | 9/2008 | Fox | H01Q 5/357 343/702 |
| 8,138,977 | B2 | 3/2012 | Zhang et al. | |
| 8,432,322 | B2 * | 4/2013 | Amm | H03K 17/955 343/702 |
| 8,493,272 | B2 * | 7/2013 | Ollikainen | H01Q 9/14 343/749 |
| 8,803,757 | B2 * | 8/2014 | Shen | H01Q 9/0457 343/857 |
| 8,933,857 | B2 | 1/2015 | Ryu | |
| 9,074,070 | B2 * | 7/2015 | Yung | C09K 19/38 |
| 9,300,342 | B2 | 3/2016 | Schlub et al. | |
| 9,653,777 | B2 | 5/2017 | Guterman et al. | |
| 9,667,290 | B2 * | 5/2017 | Ouyang | H01Q 21/062 |
| 9,716,319 | B2 | 7/2017 | Caratelli et al. | |
| 10,181,646 | B2 * | 1/2019 | Celik | H01Q 1/38 |
| 10,355,344 | B1 * | 7/2019 | Ruaro | H01Q 3/24 |
| 10,530,042 | B2 | 1/2020 | Avser et al. | |
| 10,720,311 | B2 | 7/2020 | Kraus et al. | |
| 10,804,611 | B2 | 10/2020 | Pance et al. | |
| 10,886,617 | B2 * | 1/2021 | Avser | H01Q 3/2658 |
| 10,886,619 | B2 * | 1/2021 | Avser | H01Q 1/243 |
| 11,024,938 | B2 * | 6/2021 | Moon | H01Q 1/42 |
| 2001/0054978 | A1 * | 12/2001 | Adachi | H01Q 9/0485 343/700 MS |
| 2002/0196190 | A1 | 12/2002 | Lim | |
| 2006/0232474 | A1 * | 10/2006 | Fox | H01Q 5/357 343/700 MS |
| 2008/0122703 | A1 * | 5/2008 | Ying | H01Q 9/0492 343/702 |
| 2010/0103052 | A1 * | 4/2010 | Ying | H01Q 21/28 343/702 |
| 2011/0012793 | A1 | 1/2011 | Amm et al. | |
| 2012/0223866 | A1 * | 9/2012 | Ayala Vazquez | H01Q 9/42 343/893 |
| 2013/0009848 | A1 | 1/2013 | Plettemeier et al. | |
| 2013/0113674 | A1 * | 5/2013 | Ryu | H01Q 9/0485 343/848 |
| 2013/0300618 | A1 * | 11/2013 | Yarga | H01Q 1/243 343/720 |
| 2014/0085163 | A1 * | 3/2014 | Gregg | H01Q 1/243 343/872 |
| 2014/0111684 | A1 * | 4/2014 | Corbin | H05K 1/0215 343/702 |
| 2014/0313087 | A1 * | 10/2014 | Jiang | H01Q 3/22 343/745 |
| 2014/0340265 | A1 * | 11/2014 | Vazquez | H01Q 1/243 343/702 |
| 2015/0109167 | A1 * | 4/2015 | Yarga | H01Q 5/371 343/700 MS |
| 2016/0204509 | A1 * | 7/2016 | Zhai | H01Q 13/06 343/700 MS |
| 2016/0308563 | A1 * | 10/2016 | Ouyang | H01Q 25/005 |
| 2016/0322708 | A1 * | 11/2016 | Tayfeh Aligodarz | H01Q 21/0087 |
| 2018/0026341 | A1 * | 1/2018 | Mow | H01Q 1/243 343/702 |
| 2018/0090847 | A1 * | 3/2018 | Romano | H01Q 9/0414 |
| 2018/0233808 | A1 * | 8/2018 | Noori | H01Q 1/241 |
| 2019/0013584 | A1 * | 1/2019 | Ryu | H01Q 21/0006 |
| 2019/0027808 | A1 * | 1/2019 | Mow | H04R 5/04 |
| 2019/0257933 | A1 * | 8/2019 | Nath | H01Q 21/064 |
| 2019/0267718 | A1 * | 8/2019 | Rajagopalan | H01Q 1/523 |
| 2019/0319367 | A1 * | 10/2019 | Edwards | H01Q 3/2605 |
| 2020/0099138 | A1 * | 3/2020 | Garrido Lopez | H01Q 9/0407 |
| 2020/0106181 | A1 * | 4/2020 | Avser | H01Q 1/243 |
| 2020/0186180 | A1 * | 6/2020 | Park | H01Q 1/243 |
| 2020/0212569 | A1 * | 7/2020 | Kumar | H01Q 21/065 |
| 2020/0259258 | A1 * | 8/2020 | Amiri | H01Q 5/378 |
| 2020/0280131 | A1 * | 9/2020 | Avser | H01Q 21/061 |
| 2020/0280133 | A1 * | 9/2020 | Avser | H01Q 5/42 |
| 2020/0295463 | A1 * | 9/2020 | Yamada | H01Q 21/0025 |
| 2020/0303824 | A1 * | 9/2020 | Barrera | H01Q 13/18 |
| 2021/0005967 | A1 * | 1/2021 | Sudo | H01Q 5/335 |
| 2021/0091472 | A1 | 3/2021 | Avser et al. | |
| 2021/0210441 | A1 * | 7/2021 | Kim | H10K 77/111 |
| 2021/0391651 | A1 * | 12/2021 | Hasnat | H01Q 13/22 |

* cited by examiner

ELECTRONIC DEVICES HAVING BI-DIRECTIONAL DIELECTRIC RESONATOR ANTENNAS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications. It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz.

Operation at these frequencies can support high throughputs but may raise significant challenges. For example, radio-frequency signals at millimeter and centimeter wave frequencies are characterized by substantial attenuation and/or distortion during signal propagation through various mediums. In addition, if care is not taken, the antennas can be undesirably bulky and the presence of conductive electronic device components can make it difficult to incorporate circuitry for handling millimeter and centimeter wave communications into the electronic device. It can also be difficult to provide satisfactory wireless coverage at these frequencies within a full sphere around the electronic device.

It would therefore be desirable to be able to provide electronic devices with improved wireless communications circuitry such as communications circuitry that supports millimeter and centimeter wave communications.

SUMMARY

An electronic device may be provided with wireless circuitry and a housing. The housing may have peripheral conductive housing structures and a rear wall. A display may be mounted to the peripheral conductive housing structures opposite the rear wall. A front-facing phased antenna array may radiate at frequencies greater than 10 GHz through the display. A rear-facing phased antenna array may radiate at frequencies greater than 10 GHz through the rear wall.

The front-facing phased antenna array may include a front-facing dielectric resonator antenna. The rear-facing phased antenna array may include a rear-facing dielectric resonator antenna. The front-facing and rear-facing dielectric resonator antennas may share a dielectric resonating element. The dielectric resonating element may include a dielectric column disposed within an opening in a printed circuit board. The dielectric column may be embedded within a dielectric overmold. The dielectric resonating element may be fed using at least a first feed probe for the front-facing dielectric resonator antenna and a second feed probe for the rear-facing dielectric resonator antenna. The antennas may also share a feed probe. The first feed probe may excite a volume of the dielectric column between the first feed probe and the display to radiate through the display. The second feed probe may excite a volume of the dielectric column between the second feed probe and the rear wall to radiate through the rear wall.

The dielectric column may have a geometry that helps to isolate the front-facing dielectric resonator antenna from the rear-facing dielectric resonator antenna. For example, the dielectric column may include a notch between the first feed probe and the second feed probe or the feed probes may be disposed within the notch. The feed probes may additionally or alternatively have inverted orientations. Additional feed probes may be used for covering additional polarizations. In this way, the device may include phased antenna arrays for covering an entire sphere around the device while occupying a minimal amount of volume within the device.

DETAILED DESCRIPTION

Figure 1:
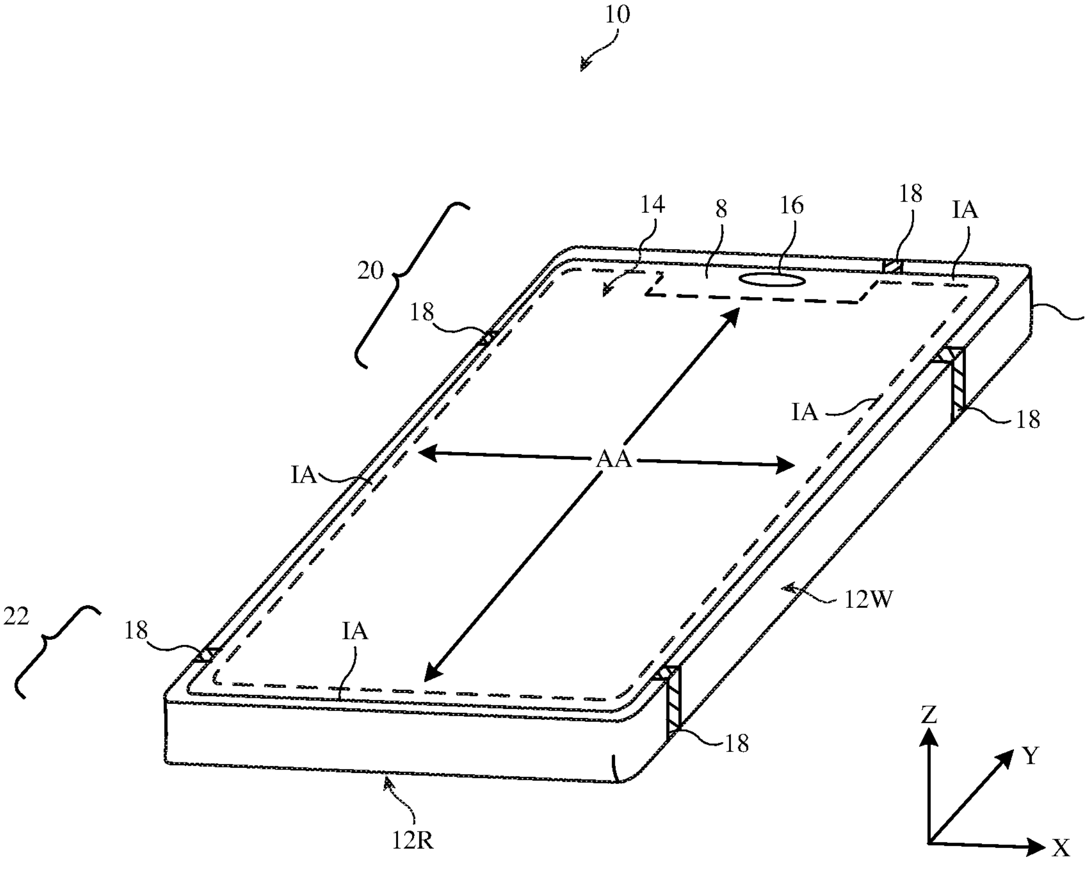
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions.

Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region or notch that extends into active area AA (e.g., at speaker port 16). Active area AA may, for example, be defined by the lateral area of a display module for display 14 (e.g., a display module that includes pixel circuitry, touch sensor circuitry, etc.).

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
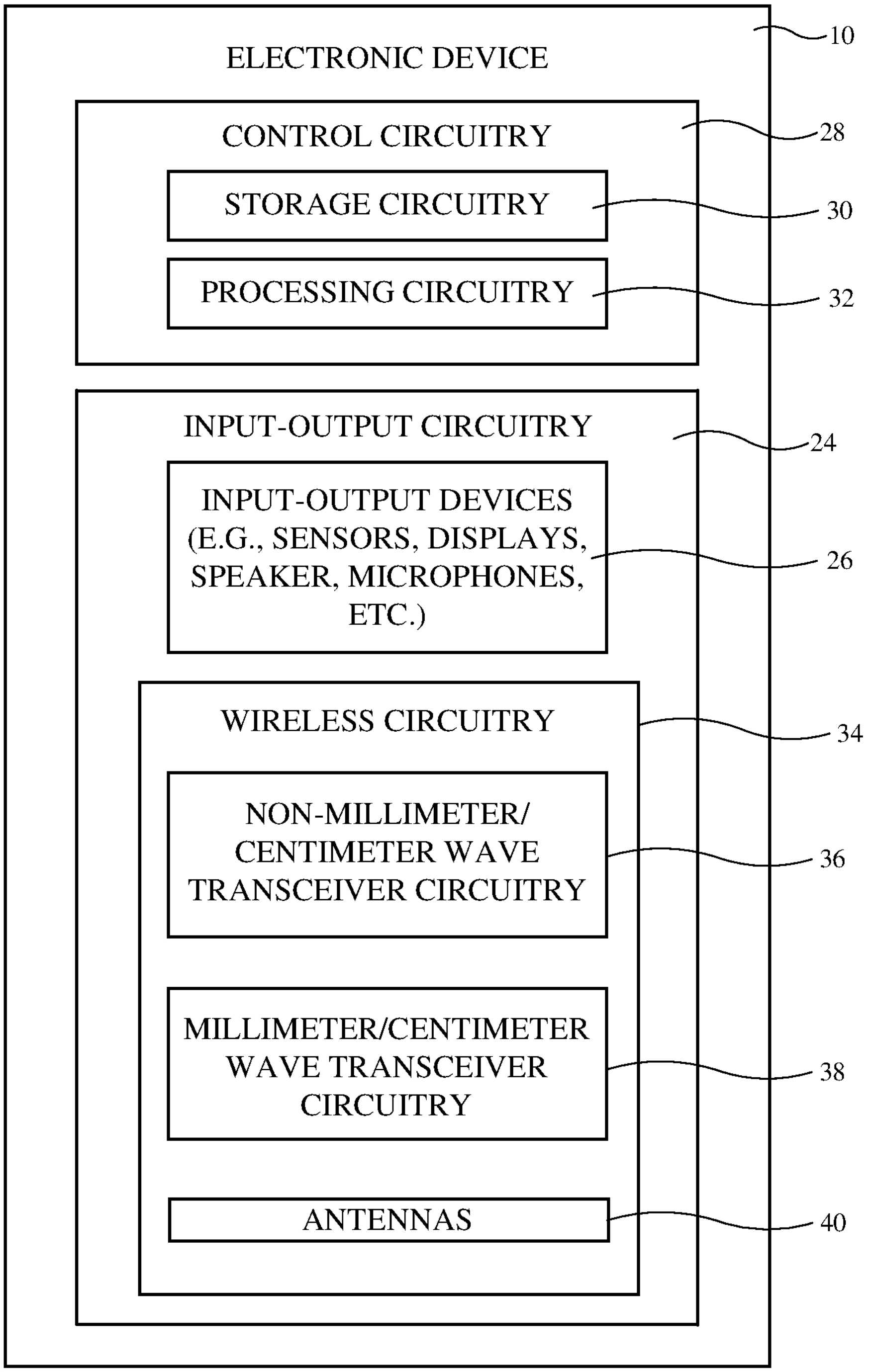
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include millimeter and centimeter wave transceiver circuitry such as millimeter/centimeter wave transceiver circuitry 38. Millimeter/centimeter wave transceiver circuitry 38 may support communications at frequencies between about 10 GHz and 300 GHz. For example, millimeter/centimeter wave transceiver circuitry 38 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 38 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 38 may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz. Millimeter/centimeter wave transceiver circuitry 38 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 38 (sometimes referred to herein simply as transceiver circuitry 38 or millimeter/centimeter wave circuitry 38) may perform spatial ranging operations using radio-frequency signals at millimeter and/or centimeter wave frequencies that are transmitted and received by millimeter/centimeter wave transceiver circuitry 38. The received signals may be a version of the transmitted signals that have been reflected off of external objects and back towards device 10. Control circuitry 28 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 28 may also process the transmitted and received signals to identify a two or three-dimensional spatial location of the external objects relative to device 10.

Spatial ranging operations performed by millimeter/centimeter wave transceiver circuitry 38 are unidirectional. If desired, millimeter/centimeter wave transceiver circuitry 38 may also perform bidirectional communications with external wireless equipment such as external wireless equipment 10 (e.g., over a bi-directional millimeter/centimeter wave wireless communications link). The external wireless equipment may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 38 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 34 may include transceiver circuitry for handling communications at frequencies below 10 GHz such as non-millimeter/centimeter wave transceiver circuitry 36. For example, non-millimeter/centimeter wave transceiver circuitry 36 may handle wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, etc.), near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest. The communications bands handled by the radio-frequency transceiver circuitry may sometimes be referred to herein as frequency bands or simply as "bands," and may span corresponding ranges of frequencies. Non-millimeter/centimeter wave transceiver circuitry 36 and millimeter/centimeter wave transceiver circuitry 38 may each include one or more integrated circuits, power amplifier circuitry, low-noise input amplifiers, passive radio-frequency components, switching circuitry, transmission line structures, and other circuitry for handling radio-frequency signals.

In general, the transceiver circuitry in wireless circuitry 34 may cover (handle) any desired frequency bands of interest. As shown in FIG. 2, wireless circuitry 34 may include antennas 40. The transceiver circuitry may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 38 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 36 and another type of antenna may be used in conveying radio-frequency signals at millimeter and/or centimeter wave frequencies for millimeter/centimeter wave transceiver circuitry 38. Antennas 40 that are used to convey radio-frequency signals at millimeter and centimeter wave frequencies may be arranged in one or more phased antenna arrays.

Figure 3:
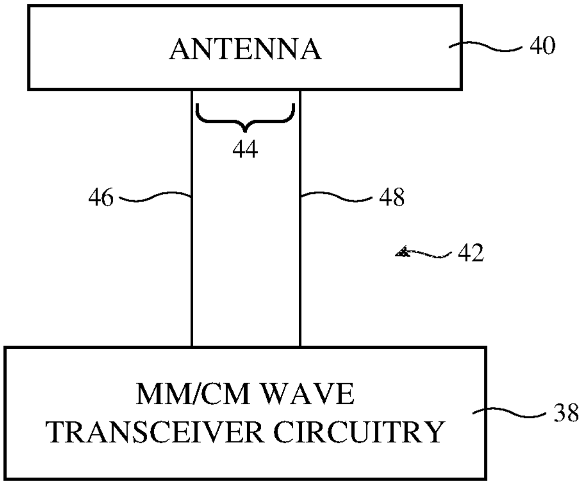
FIG. 3 is a schematic diagram of illustrative wireless circuitry in accordance with some embodiments.

A schematic diagram of an antenna 40 that may be formed in a phased antenna array for conveying radio-frequency signals at millimeter and centimeter wave frequencies is shown in FIG. 3. As shown in FIG. 3, antenna 40 may be coupled to millimeter/centimeter (MM/CM) wave transceiver circuitry 38. Millimeter/centimeter wave transceiver circuitry 38 may be coupled to antenna feed 44 of antenna 40 using a transmission line path that includes radio-frequency transmission line 42. Radio-frequency transmission line 42 may include a positive signal conductor such as signal conductor 46 and may include a ground conductor such as ground conductor 48. Ground conductor 48 may be coupled to the antenna ground for antenna 40 (e.g., over a ground antenna feed terminal of antenna feed 44 located at the antenna ground). Signal conductor 46 may be coupled to the antenna resonating element for antenna 40. For example, signal conductor 46 may be coupled to a positive antenna feed terminal of antenna feed 44 located at the antenna resonating element.

In another suitable arrangement, antenna 40 may be a probe-fed antenna that is fed using a feed probe. In this arrangement, antenna feed 44 may be implemented as a feed probe. Signal conductor 46 may be coupled to the feed probe. Radio-frequency transmission line 42 may convey radio-frequency signals to and from the feed probe. When radio-frequency signals are being transmitted over the feed probe and the antenna, the feed probe may excite the resonating element for the antenna (e.g., may excite electromagnetic resonant modes of a dielectric antenna resonating element for antenna 40). The resonating element may radiate the radio-frequency signals in response to excitation by the feed probe. Similarly, when radio-frequency signals are received by the antenna (e.g., from free space), the radio-frequency signals may excite the resonating element for the antenna (e.g., may excite electromagnetic resonant modes of the dielectric antenna resonating element for antenna 40). This may produce antenna currents on the feed probe and the corresponding radio-frequency signals may be passed to the transceiver circuitry over the radio-frequency transmission line.

Radio-frequency transmission line 42 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 38 to antenna feed 44. Filter circuitry, switching circuitry, impedance matching circuitry, phase shifter circuitry, amplifier circuitry, and/or other circuitry may be interposed on radio-frequency transmission line 42, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
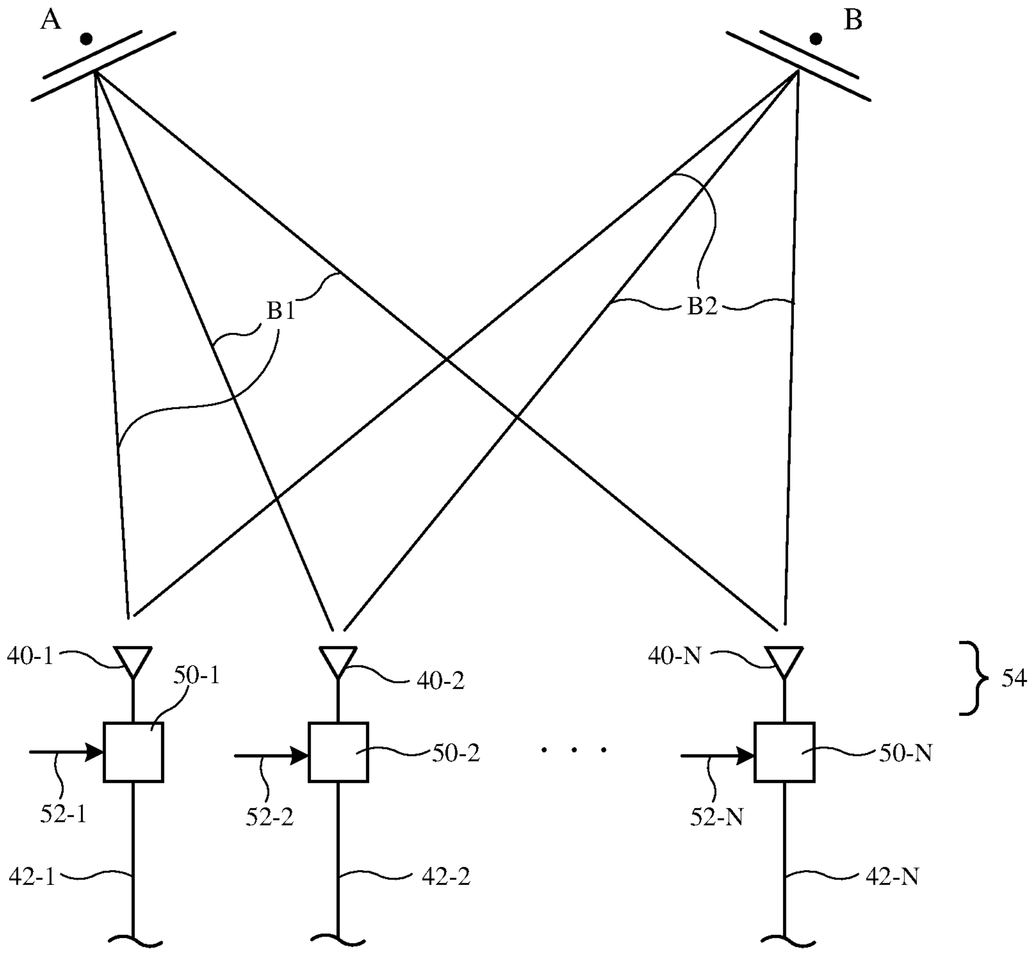
FIG. 4 is a diagram of an illustrative phased antenna array in accordance with some embodiments.

FIG. 4 shows how antennas 40 for handling radio-frequency signals at millimeter and centimeter wave frequencies may be formed in a phased antenna array. As shown in FIG. 4, phased antenna array 54 (sometimes referred to herein as array 54, antenna array 54, or array 54 of antennas 40) may be coupled to radio-frequency transmission lines 42. For example, a first antenna 40-1 in phased antenna array 54 may be coupled to a first radio-frequency transmission line 42-1, a second antenna 40-2 in phased antenna array 54 may be coupled to a second radio-frequency transmission line 42-2, an Nth antenna 40-N in phased antenna array 54 may be coupled to an Nth radio-frequency transmission line 42-N, etc. While antennas 40 are described herein as forming a phased antenna array, the antennas 40 in phased antenna array 54 may sometimes also be referred to as collectively forming a single phased array antenna.

Antennas 40 in phased antenna array 54 may be arranged in any desired number of rows and columns or in any other desired pattern (e.g., the antennas need not be arranged in a grid pattern having rows and columns). During signal transmission operations, radio-frequency transmission lines 42 may be used to supply signals (e.g., radio-frequency signals such as millimeter wave and/or centimeter wave signals) from millimeter/centimeter wave transceiver circuitry 38 (FIG. 3) to phased antenna array 54 for wireless transmission. During signal reception operations, radio-frequency transmission lines 42 may be used to supply signals received at phased antenna array 54 (e.g., from external wireless equipment or transmitted signals that have been reflected off of external objects) to millimeter/centimeter wave transceiver circuitry 38 (FIG. 3).

The use of multiple antennas 40 in phased antenna array 54 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 50 (e.g., a first phase and magnitude controller 50-1 interposed on radio-frequency transmission line 42-1 may control phase and magnitude for radio-frequency signals handled by antenna 40-1, a second phase and magnitude controller 50-2 interposed on radio-frequency transmission line 42-2 may control phase and magnitude for radio-frequency signals handled by antenna 40-2, an Nth phase and magnitude controller 50-N interposed on radio-frequency transmission line 42-N may control phase and magnitude for radio-frequency signals handled by antenna 40-N, etc.).

Phase and magnitude controllers 50 may each include circuitry for adjusting the phase of the radio-frequency signals on radio-frequency transmission lines 42 (e.g., phase shifter circuits) and/or circuitry for adjusting the magnitude of the radio-frequency signals on radio-frequency transmission lines 42 (e.g., power amplifier and/or low noise amplifier circuits). Phase and magnitude controllers 50 may sometimes be referred to collectively herein as beam steering circuitry (e.g., beam steering circuitry that steers the beam of radio-frequency signals transmitted and/or received by phased antenna array 54).

Phase and magnitude controllers 50 may adjust the relative phases and/or magnitudes of the transmitted signals that are provided to each of the antennas in phased antenna array 54 and may adjust the relative phases and/or magnitudes of the received signals that are received by phased antenna array 54. Phase and magnitude controllers 50 may, if desired, include phase detection circuitry for detecting the phases of the received signals that are received by phased antenna array 54. The term "beam" or "signal beam" may be used herein to collectively refer to wireless signals that are transmitted and received by phased antenna array 54 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 50 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 50 are adjusted to produce a second set of phases and/or magnitudes for the transmitted signals, the transmitted signals will form a transmit beam as shown by beam B2 that is oriented in the direction of point B. Similarly, if phase and magnitude controllers 50 are adjusted to produce the first set of phases and/or magnitudes, radio-frequency signals (e.g., radio-frequency signals in a receive beam) may be received from the direction of point A, as shown by beam B1. If phase and magnitude controllers 50 are adjusted to produce the second set of phases and/or magnitudes, radio-frequency signals may be received from the direction of point B, as shown by beam B2.

Each phase and magnitude controller 50 may be controlled to produce a desired phase and/or magnitude based on a corresponding control signal 52 received from control circuitry 28 of FIG. 2 (e.g., the phase and/or magnitude provided by phase and magnitude controller 50-1 may be controlled using control signal 52-1, the phase and/or magnitude provided by phase and magnitude controller 50-2 may be controlled using control signal 52-2, etc.). If desired, the control circuitry may actively adjust control signals 52 in real time to steer the transmit or receive beam in different desired directions over time. Phase and magnitude controllers 50 may provide information identifying the phase of received signals to control circuitry 28 if desired.

When performing wireless communications using radio-frequency signals at millimeter and centimeter wave frequencies, the radio-frequency signals are conveyed over a line of sight path between phased antenna array 54 and external communications equipment. If the external object is located at point A of FIG. 4, phase and magnitude controllers 50 may be adjusted to steer the signal beam towards point A (e.g., to steer the pointing direction of the signal beam towards point A). Phased antenna array 54 may transmit and receive radio-frequency signals in the direction of point A. Similarly, if the external communications equipment is located at point B, phase and magnitude controllers 50 may be adjusted to steer the signal beam towards point B (e.g., to steer the pointing direction of the signal beam towards point B). Phased antenna array 54 may transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 54 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Figure 5:
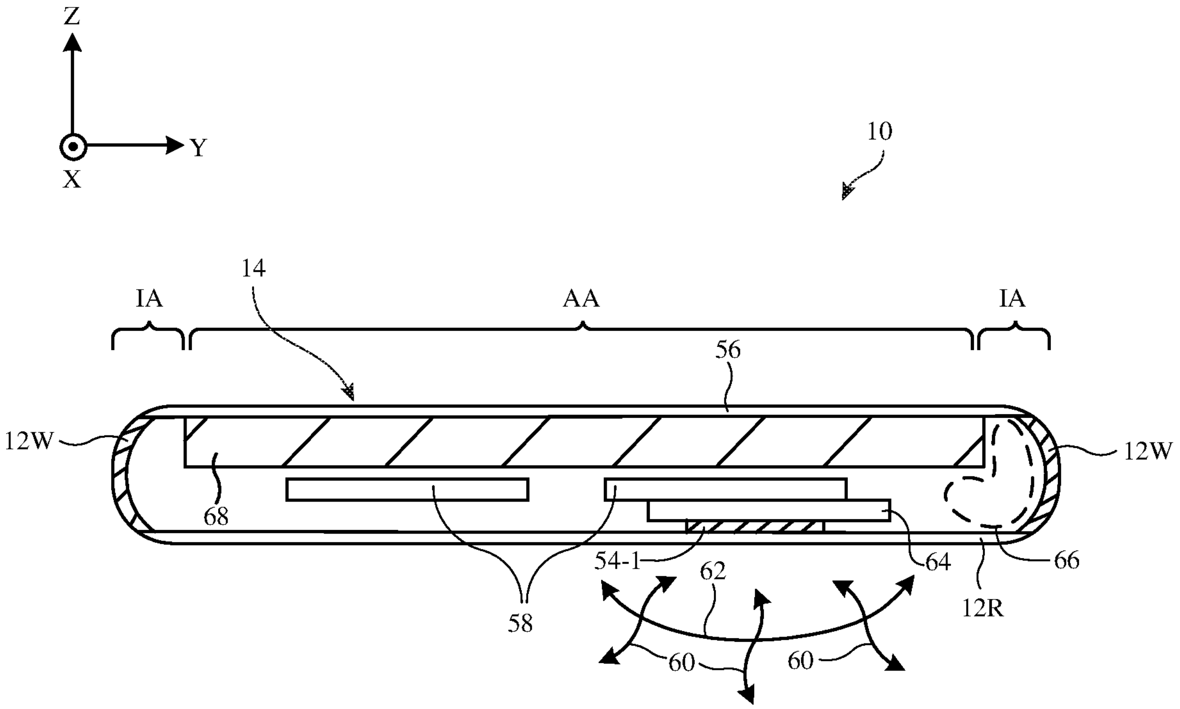
FIG. 5 is a cross-sectional side view of an illustrative electronic device having phased antenna arrays for radiating through different sides of the device in accordance with some embodiments.

FIG. 5 is a cross-sectional side view of device 10 in an example where device 10 has multiple phased antenna arrays. As shown in FIG. 5, peripheral conductive housing structures 12W may extend around the (lateral) periphery of device 10 and may extend from rear housing wall 12R to display 14. Display 14 may have a display module such as display module 68 (sometimes referred to as a display panel). Display module 68 may include pixel circuitry, touch sensor circuitry, force sensor circuitry, and/or any other desired circuitry for forming active area AA of display 14. Display 14 may include a dielectric cover layer such as display cover layer 56 that overlaps display module 68. Display module 68 may emit image light and may receive sensor input through display cover layer 56. Display cover layer 56 and display 14 may be mounted to peripheral conductive housing structures 12W. The lateral area of display 14 that does not overlap display module 68 may form inactive area IA of display 14.

Device 10 may include multiple phased antenna arrays 54 such as a rear-facing phased antenna array 54-1. As shown in FIG. 5, phased antenna array 54-1 may transmit and receive radio-frequency signals 60 at millimeter and centimeter wave frequencies through rear housing wall 12R. In scenarios where rear housing wall 12R includes metal portions, radio-frequency signals 60 may be conveyed through an aperture or opening in the metal portions of rear housing wall 12R or may be conveyed through other dielectric portions of rear housing wall 12R. The aperture may be overlapped by a dielectric cover layer or dielectric coating that extends across the lateral area of rear housing wall 12R (e.g., between peripheral conductive housing structures 12W). Phased antenna array 54-1 may perform beam steering for radio-frequency signals 60 across the hemisphere below device 10, as shown by arrow 62.

Phased antenna array 54-1 may be mounted to a substrate such as substrate 64. Substrate 64 may be an integrated circuit chip, a flexible printed circuit, a rigid printed circuit board, or other substrate. Substrate 64 may sometimes be referred to herein as antenna module 64. If desired, transceiver circuitry (e.g., millimeter/centimeter wave transceiver circuitry 38 of FIG. 2) may be mounted to antenna module 64. Phased antenna array 54-1 may be adhered to rear housing wall 12R using adhesive, may be pressed against (e.g., in contact with) rear housing wall 12R, or may be spaced apart from rear housing wall 12R.

The field of view of phased antenna array 54-1 is limited to the hemisphere under the rear face of device 10. Display module 68 and other components 58 (e.g., portions of input-output circuitry 24 or control circuitry 28 of FIG. 2, a battery for device 10, etc.) in device 10 include conductive structures. If care is not taken, these conductive structures may block radio-frequency signals from being conveyed by a phased antenna array within device 10 across the hemisphere over the front face of device 10. While an additional phased antenna array for covering the hemisphere over the front face of device 10 may be mounted against display cover layer 56 within inactive area IA, there may be insufficient space between the lateral periphery of display module 68 and peripheral conductive housing structures 12W to form all of the circuitry and radio-frequency transmission lines necessary to fully support the phased antenna array.

In order to mitigate these issues and provide coverage through the front face of device 10, a front-facing phased antenna array may be mounted within peripheral region 66 of device 10. The antennas in the front-facing phased antenna array may include dielectric resonator antennas. Dielectric resonator antennas may occupy less area in the X-Y plane of FIG. 5 than other types of antennas such as patch antennas and slot antennas. Implementing the antennas as dielectric resonator antennas may allow the radiating elements of the front-facing phased antenna array to fit within inactive area IA between display module 68 and peripheral conductive housing structures 12W. At the same time, the radio-frequency transmission lines and other components for the phased antenna array may be located behind (under) display module 68. While examples are described herein in which the phased antenna array is a front-facing phased antenna array that radiates through display 14, in another suitable arrangement, the phased antenna array may be a side-facing phased antenna array that radiates through one or more apertures in peripheral conductive housing structures 12W.

In order to further optimize space within device 10 while providing a full sphere of wireless coverage around device 10, the dielectric resonator antennas in peripheral region 66 may include front-facing dielectric resonator antennas (e.g., in a front-facing phased antenna array of dielectric resonator antennas) and rear-facing dielectric resonator antennas (e.g., in a rear-facing phased antenna array of dielectric resonator antennas). The front-facing dielectric resonator antennas may convey radio-frequency signals through display cover layer 56 and within the hemisphere over the front face of device 10 (display 14). The rear-facing dielectric resonator antennas may convey radio-frequency signals through dielectric portions of rear housing wall 12R and within the hemisphere under the rear face of device 10 (rear housing wall 12R). In these examples, device 10 may also include phased antenna array 54-1 for providing additional coverage within the hemisphere under the rear face of device 10 or phased antenna array 54-1 may be omitted, thereby saving additional space within device 10. In order to allow for front-facing and rear-facing dielectric resonator antennas to fit within peripheral region 66 (e.g., without requiring device 10 to be excessively thick in the Z-dimension), the front-facing dielectric resonator antennas and the rear-facing dielectric resonator antennas may share dielectric resonating elements.

Figure 6:
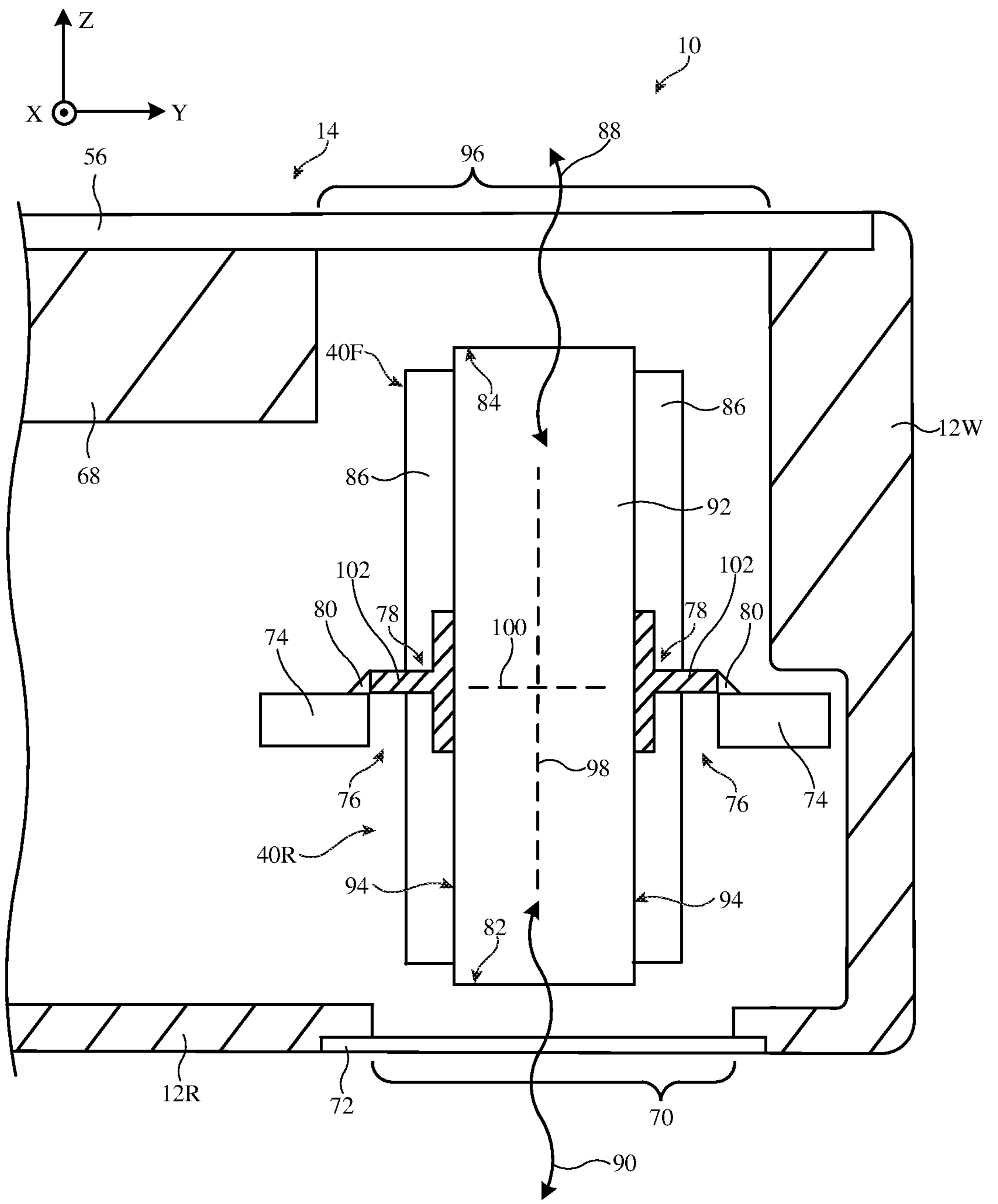
FIG. 6 is a cross-sectional side view of an illustrative electronic device having a bi-directional dielectric resonating element that is used in both a front-facing dielectric resonator antenna and a rear-facing dielectric resonator antenna in accordance with some embodiments.

FIG. 6 is a cross-sectional side view showing how a given dielectric resonating element in peripheral region 66 of device 10 may be used to form both a front-facing dielectric resonator antenna and a rear-facing dielectric resonator antenna. As shown in FIG. 6, device 10 may include a front-facing phased antenna array having a given front-facing antenna 40F and may include a rear-facing phased antenna array having a given rear-facing antenna 40R (e.g., mounted within peripheral region 66 of FIG. 5). The front-facing phased antenna array may include any desired number of front-facing antennas (e.g., a one-dimensional or two-dimensional array of front-facing antennas). The rear-facing phased antenna array may include any desired number of rear-facing antennas (e.g., a one-dimensional or two-dimensional array of rear-facing antennas).

Antennas 40F and 40R may each be dielectric resonator antennas that share a single dielectric resonating element 92. Dielectric resonating element 92 may be mounted to a substrate such as printed circuit 74. Printed circuit 74 may be a rigid printed circuit board or a flexible printed circuit, as examples. Printed circuit 74 has a lateral area (e.g., in the X-Y plane of FIG. 6) that extends along rear housing wall 12R. Printed circuit 74 may be secured to rear housing wall 12R and/or peripheral conductive housing structures 12W using one or more screws (e.g., grounding screws), adhesive, and/or any other desired structures. The millimeter/centimeter wave transceiver circuitry for front-facing antenna 40F and rear-facing antenna 40R may be mounted to printed circuit 74 or to a different substrate in device 10 (e.g., a main logic board or other substrate separate from printed circuit 74).

Printed circuit 74 may include multiple stacked dielectric layers. The dielectric layers may include polyimide, ceramic, liquid crystal polymer, plastic, and/or any other desired dielectric materials. Conductive traces may be patterned onto the top surface of printed circuit 74, the bottom surface of printed circuit 74, and/or on the dielectric layers within printed circuit 74. Some of the conductive traces may be held at a ground potential to form ground traces (e.g., part of the antenna ground) for front-facing antenna 40F and rear-facing antenna 40R. The ground traces may be coupled to a system ground in device 10 (e.g., using solder, welds, conductive adhesive, conductive tape, conductive brackets, conductive pins, conductive screws, conductive clips, combinations of these, etc.). For example, the ground traces may be coupled to peripheral conductive housing structures 12W, conductive portions of rear housing wall 12R, or other grounded structures in device 10.

Printed circuit 74 may include one or more openings such as opening 76. Dielectric resonating element 92 may be mounted within opening 76 (e.g., dielectric resonating element 92 may protrude through opening 76). Front-facing antenna 40F may be fed using one or more radio-frequency transmission lines formed on and/or embedded within printed circuit 74. Rear-facing antenna 40R may also be fed using one or more radio-frequency transmission lines formed on and/or embedded within printed circuit 74. The radio-frequency transmission lines have ground conductors (e.g., ground conductor 48 of FIG. 3) that include the ground traces on printed circuit 74. The radio-frequency transmission lines may also have signal conductors (e.g., signal conductor 46 of FIG. 3) that include some of the conductive traces on printed circuit 74.

Dielectric resonating element 92 may be formed from a column (pillar) of dielectric material mounted within opening 76 in printed circuit 74. Dielectric resonating element 92 may be embedded within (e.g., laterally surrounded by) a dielectric substrate such as dielectric overmold 86. While a non-zero clearance is shown between dielectric overmold 86 and circuit board 74 in FIG. 6 for the sake of clarity, dielectric overmold 86 may completely fill opening 76 if desired. Dielectric overmold 86 may help to secure dielectric resonating element 92 to printed circuit 74. If desired, dielectric overmold 86 may help to secure dielectric resonating element 92 to peripheral conductive housing structures 12W.

Dielectric resonating element 92 may have a first (bottom) surface 82 facing rear housing wall 12R. Rear housing wall 12R may include conductive material. A slot such as slot 70 may be formed in the conductive material of rear housing wall 12R at a location overlapping dielectric resonating element 92. A dielectric antenna window such as dielectric antenna window 72 may be mounted to rear housing wall 12R and may cover slot 70. Additionally or alternatively, a dielectric cover layer may cover the entire rear surface of device 10 (rear housing wall 12R). Slot 70 may sometimes also be referred to herein as opening 70 or antenna window 70.

Dielectric resonating element 92 may have a second (top) surface 84 at display 14. Top surface 84 may be laterally interposed between display module 68 and peripheral conductive housing structures 12W (e.g., part of dielectric resonating element 92 may be located within gap 96 between display module 68 and peripheral conductive housing structures 12W, which forms part of the inactive area of display 14). Dielectric resonating element 92 may have vertical sidewalls 94 that extend from top surface 84 to bottom surface 82. Dielectric resonating element 92 may have a longitudinal axis 98 (e.g., parallel to the Z-axis) that runs through the center of both top surface 84 and bottom surface 82. Longitudinal axis 98 may be, for example, the longest rectangular dimension of dielectric resonating element 92. Dielectric resonating element 92 may have a height (measured parallel to longitudinal axis 98) measured from top surface 84 to bottom surface 82. Dielectric resonating element 92 may also have a length (measured parallel to the X-axis) and a width (measured parallel to the Y-axis) that are each less than the height of dielectric resonating element 92.

Dielectric resonating element 92 may have a central axis 100 that passes through longitudinal axis 98 and that divides (e.g., bisects) the height of dielectric resonating element 92. Central axis 100 is oriented orthogonal to longitudinal axis 98. Central axis 100 need not bisect the height of dielectric resonating element 92. Central axis 100 may separate the portion of dielectric resonating element 92 used to form front-facing antenna 40F from the portion of dielectric resonating element 92 used to form rear-facing antenna 40R. The operating (resonant) frequency of front-facing antenna 40F may be selected by adjusting the dimensions of dielectric resonating element 92 above central axis 100. Similarly, the operating (resonant) frequency of rear-facing antenna 40R may be selected by adjusting the dimensions of dielectric resonating element 92 below central axis 100. The geometry of dielectric resonating element 92 below central axis 100 may also have some effect on the operating frequency of front-facing antenna 40F and/or the geometry of dielectric resonating element 92 above central axis 100 may also have some effect on the operating frequency of rear-facing antenna 40R.

Dielectric resonating element 92 may be formed from a column of dielectric material having a first dielectric constant $\varepsilon_{r1}$. Dielectric constant $\varepsilon_{r1}$ may be relatively high (e.g., greater than 10.0, greater than 12.0, greater than 15.0, greater than 20.0, between 15.0 and 40.0, between 10.0 and 50.0, between 18.0 and 30.0, between 12.0 and 45.0, etc.). In one suitable arrangement, dielectric resonating element 92 may be formed from zirconia or a ceramic material. Other dielectric materials may be used to form dielectric resonating element 92 if desired.

Dielectric overmold 86 may be formed from a material having dielectric constant $\varepsilon_{r2}$. Dielectric constant $\varepsilon_{r2}$ may be less than dielectric constant $\varepsilon_{r1}$ of dielectric resonating element 92 (e.g., less than 18.0, less than 15.0, less than 10.0, between 3.0 and 4.0, less than 5.0, between 2.0 and 5.0, etc.). Dielectric constant $\varepsilon_{r2}$ may be less than dielectric constant $\varepsilon_{r1}$ by at least 10.0, 5.0, 15.0, 12.0, 6.0, etc. In one suitable arrangement, dielectric overmold 86 may be formed from molded plastic (e.g., injection-molded plastic). Other dielectric materials may be used to form dielectric overmold 86 or dielectric overmold 86 may be omitted if desired. The difference in dielectric constant between dielectric resonating element 92 and dielectric overmold 86 may help to establish a radio-frequency boundary condition between dielectric resonating element 92 and dielectric overmold 86 from bottom surface 82 to top surface 84. This may configure dielectric resonating element 92 to serve as a waveguide for propagating radio-frequency signals at millimeter and centimeter wave frequencies.

Dielectric resonating element 92 may radiate radio-frequency signals when excited by the signal conductor(s) for the radio-frequency transmission line(s) in printed circuit 74. The antennas formed from dielectric resonating element 92 may be fed using radio-frequency feed probes such as feed probes 78. Feed probes 78 may form part of the antenna feeds for front-facing antenna 40F and rear-facing antenna 40R (e.g., antenna feed 44 of FIG. 3). Front-facing antenna 40F may be fed using at least one of the feed probes 78. Rear-facing antenna 40R may also be fed using at least one of the feed probes 78. If desired, antennas 40F and 40R may be fed using different (independent) feed probes 78.

As shown in FIG. 6, each feed probe 78 may include a respective feed conductor 102. At least a portion of feed conductor 102 (e.g., a patch-shaped portion of feed conductor 102) may be in contact with a sidewall 94 of dielectric resonating element 92. Feed conductor 102 may be formed from stamped sheet metal that is folded and pressed against sidewall 94 (e.g., by biasing structures and/or by dielectric overmold 86). In another implementation, feed conductor 102 may be formed from conductive traces that are patterned directly onto sidewall 94 (e.g., using a sputtering process, a laser direct structuring process, or other conductive deposition techniques). A portion of feed conductor 102 may be coupled to signal traces on printed circuit 74 using conductive interconnect structures 80. Conductive interconnect structures 80 may include solder, welds, conductive adhesive, conductive tape, conductive foam, conductive springs, conductive brackets, and/or any other desired conductive interconnect structures.

The signal traces in printed circuit 74 may convey radio-frequency signals to and from feed probes 78. Feed probes 78 may electromagnetically couple the radio-frequency signals on the signal traces into dielectric resonating element 92. The feed probe 78 for front-facing antenna 40F may couple radio-frequency signals into dielectric resonating element 92 that excite one or more electromagnetic modes of dielectric resonating element 92 located predominantly between central axis 100 and top surface 84 (e.g., radio-frequency cavity or waveguide modes between around central axis 100 and top surface 84). When excited by the feed probe 78 for front-facing antenna 40F, these electromagnetic modes of dielectric resonating element 92 may configure the dielectric resonating element to serve as a waveguide that propagates the wavefronts of radio-frequency signals 88 along the length of dielectric resonating element 92 (e.g., in the direction of the Z-axis of FIG. 6), through top surface 84, and through display 14.

For example, during signal transmission, the feed probe 78 for front-facing antenna 40F may couple the radio-frequency signals on the signal traces into dielectric resonating element 92. This may serve to excite one or more electromagnetic modes of the volume of dielectric resonating element 92 between around central axis 100 and top surface 84, resulting in the propagation of radio-frequency signals 88 up the length of dielectric resonating element 92 and to the exterior of device 10 through display cover layer 56. Similarly, during signal reception, radio-frequency signals 88 may be received through display cover layer 56. The received radio-frequency signals may excite the electromagnetic modes of dielectric resonating element 92 between top surface 84 and around central axis 100, resulting in the propagation of the radio-frequency signals down the length of dielectric resonating element 92. The feed probe 78 for front-facing antenna 40F may couple the received radio-frequency signals onto a corresponding radio-frequency transmission line on printed circuit 74, which passes the radio-frequency signals to the millimeter/centimeter wave transceiver circuitry in device 10.

Similarly, the feed probe 78 for rear-facing antenna 40R may couple radio-frequency signals into dielectric resonating element 92 that excite one or more electromagnetic modes of dielectric resonating element 92 located predominantly between central axis 100 and bottom surface 82 (e.g., radio-frequency cavity or waveguide modes between around central axis 100 and bottom surface 82). When excited by the feed probe 78 for rear-facing antenna 40R, these electromagnetic modes of dielectric resonating element 92 may configure the dielectric resonating element to serve as a waveguide that propagates the wavefronts of radio-frequency signals 90 along the length of dielectric resonating element 92 (e.g., in the direction of the Z-axis of FIG. 6), through bottom surface 82, and through dielectric antenna window 72.

For example, during signal transmission, the feed probe 78 for rear-facing antenna 40R may couple the radio-frequency signals on the signal traces into dielectric resonating element 92. This may serve to excite one or more electromagnetic modes of the volume of dielectric resonating element 92 between around central axis 100 and bottom surface 82, resulting in the propagation of radio-frequency signals 90 down the length of dielectric resonating element 92 and to the exterior of device 10 through dielectric antenna window 72 and slot 70. Similarly, during signal reception, radio-frequency signals 90 may be received through antenna window 72 and slot 70. The received radio-frequency signals may excite the electromagnetic modes of dielectric resonating element 92 between bottom surface 82 and around central axis 100, resulting in the propagation of the radio-frequency signals up the length of dielectric resonating element 92. The feed probe 78 for rear-facing antenna 40R may couple the received radio-frequency signals onto a corresponding radio-frequency transmission line on printed circuit 74, which passes the radio-frequency signals to the millimeter/centimeter wave transceiver circuitry in device 10. The relatively large difference in dielectric constant between dielectric resonating element 92 and dielectric overmold 86 may allow dielectric resonating element 92 to convey radio-frequency signals 88 and 90 with a relatively high antenna efficiency (e.g., by establishing a strong boundary between dielectric resonating element 92 and dielectric overmold 86 for the radio-frequency signals). The relatively high dielectric constant of dielectric resonating element 92 may also allow the dielectric resonating element 92 to occupy a relatively small volume compared to scenarios where materials with a lower dielectric constant are used.

The dimensions of feed probes 78 may be selected to help match the impedance of the radio-frequency transmission lines in printed circuit 74 to the impedance of dielectric resonating element 92. Each feed probe 78 may be located on a respective sidewall 94 of dielectric resonating element 92 to provide antennas 40F and 40R with a desired linear polarization (e.g., a vertical or horizontal polarization). If desired, multiple feed probes 78 may be formed on multiple sidewalls 94 of dielectric resonating element 92 to configure antennas 40F and 40R to cover multiple orthogonal linear polarizations at once. The phase of each feed probe may be independently adjusted over time to provide the antenna with other polarizations such as an elliptical or circular polarization if desired. Feed probes 78 may sometimes be referred to herein as feed conductors 78, feed patches 78, or probe feeds 78. Dielectric resonating element 92 may sometimes be referred to herein as a dielectric radiating element, dielectric radiator, dielectric resonator, dielectric antenna resonating element, dielectric column, dielectric pillar, radiating element, or resonating element.

Figure 7:
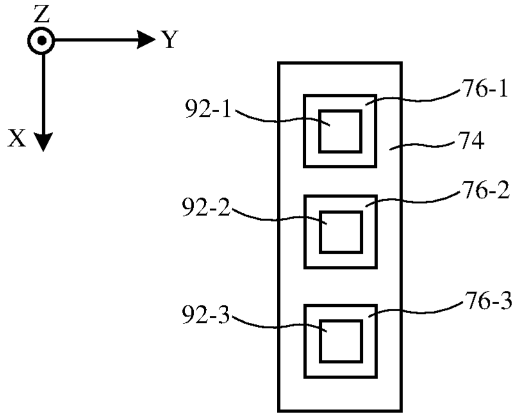
FIG. 7 is a top view of an illustrative printed circuit having respective openings to accommodate each dielectric resonating element in a phased antenna array in accordance with some embodiments.

In this way, dielectric resonating element 92 may be used to form both a front-facing antenna 40F for a front-facing phased antenna array and a rear-facing antenna 40R for a rear-facing phased antenna array in device 10. If desired, printed circuit 74 may include a respective opening 76 for each dielectric resonating element 92. FIG. 7 is a top view showing one example of how printed circuit 74 may include a respective opening 76 for each dielectric resonating element 92 in the front and rear-facing phased antenna arrays.

In the example of FIG. 7, the front and rear-facing phased antenna arrays each include three antennas formed from three dielectric resonating elements 92-1, 92-2, and 92-3 arranged in a one-dimensional array pattern (e.g., dielectric resonating element 92-1 may form a first front-facing antenna and a first rear-facing antenna, dielectric resonating element 92-2 may form a second front-facing antenna and a second rear-facing antenna, etc.). As shown in FIG. 7, printed circuit 74 may completely surround (enclose) a respective opening 76 for each dielectric resonating element 92 (e.g., dielectric resonating element 92-1 may be mounted within opening 76-1, dielectric resonating element 92-2 may be mounted within opening 76-2, etc.). In other words, openings 76 may be closed slots within printed circuit 74.

Figure 8:
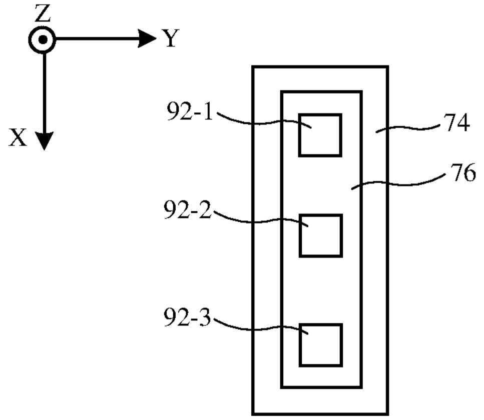
FIG. 8 is a top view of an illustrative printed circuit having a single opening that accommodates each dielectric resonating element in a phased antenna array in accordance with some embodiments.
Figure 9:
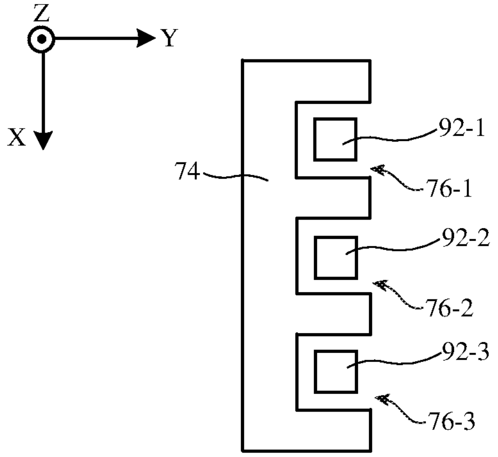
FIG. 9 is a top view of an illustrative comb-shaped printed circuit for accommodating dielectric resonating elements in a phased antenna array in accordance with some embodiments.

The example of FIG. 7 is merely illustrative. If desired, each dielectric resonating element may be located within the same opening 76, as shown in the example of FIG. 8. In another implementation, each opening 76 may be an open slot in printed circuit 74, as shown in the example of FIG. 9. As shown in FIG. 9, printed circuit 74 may surround some but not all sides of openings 76-1, 76-2, and 76-3. In other words, printed circuit 74 may be a comb-shaped PCB where openings 76-1, 76-2, and 76-3 are formed from notches in a given edge of printed circuit 74. The examples of FIGS. 7-9 are merely illustrative. Printed circuit 74 may surround any desired number of openings 76. The front and rear-facing phased antenna arrays may include any desired number of antennas formed using any desired number of dielectric resonating elements arranged in any desired array pattern.

Figure 10:
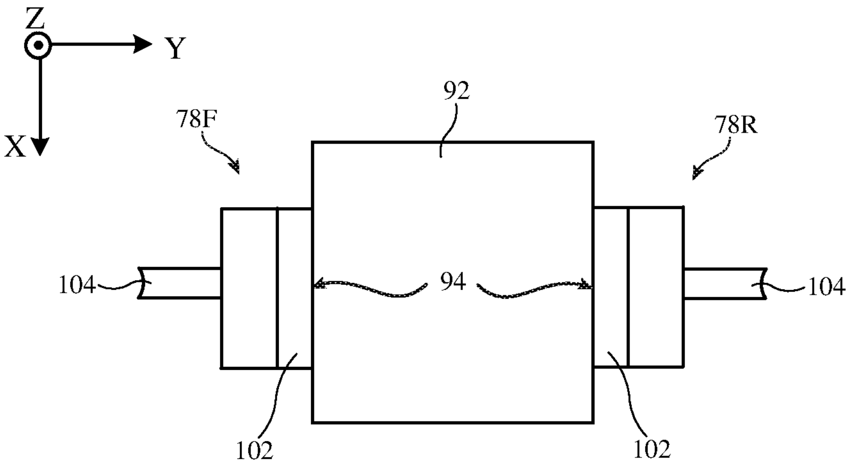
FIG. 10 is a top view showing how an illustrative dielectric resonating element may be fed using a first feed probe for a front-facing dielectric resonator antenna and using a second feed probe for a rear-facing dielectric resonator antenna in accordance with some embodiments.

FIG. 10 is a top-down view (e.g., as taken in the −Z direction of FIG. 6) of a given dielectric resonating element 92 showing how different feed probes 78 may be used to feed front-facing antenna 40F and rear-facing antenna 40R, respectively. In the example of FIG. 10, printed circuit 74 and dielectric overmold 86 have been omitted for the sake of clarity.

As shown in FIG. 10, dielectric resonating element 92 may be fed by a first feed probe 78 such as feed probe 78F for the front-facing antenna and may be fed by a second feed probe such as feed probe 78R for the rear-facing antenna (e.g., antennas 40F and 40R of FIG. 6). Feed probe 78F may include a feed conductor 102 that contacts a first sidewall 94 and feed probe 78R may include a second feed conductor 102 that contacts a second sidewall 94 of dielectric resonating element 92. Feed probes 78F and 78R may each include a respective conductive portion 104 (e.g., a conductive trace) coupled to respective signal conductors in printed circuit 74 via conductive interconnect structures 80 of FIG. 6.

In the example of FIG. 10, feed probes 78F and 78R are coupled to opposing sidewalls 94 of dielectric resonating element 92. Feed probes 78F and 78R of FIG. 10 may therefore convey radio-frequency signals with the same linear polarization. In another implementation, feed probes 78R and 78F may be coupled to orthogonal sidewalls 94 of dielectric resonating element 92. In yet another implementation, feed probes 78R and 78F may be coupled to the same sidewall 94 of dielectric resonating element 92. If desired, the front-facing and rear-facing antennas may convey radio-frequency signals using orthogonal linear polarizations.

Figure 11:
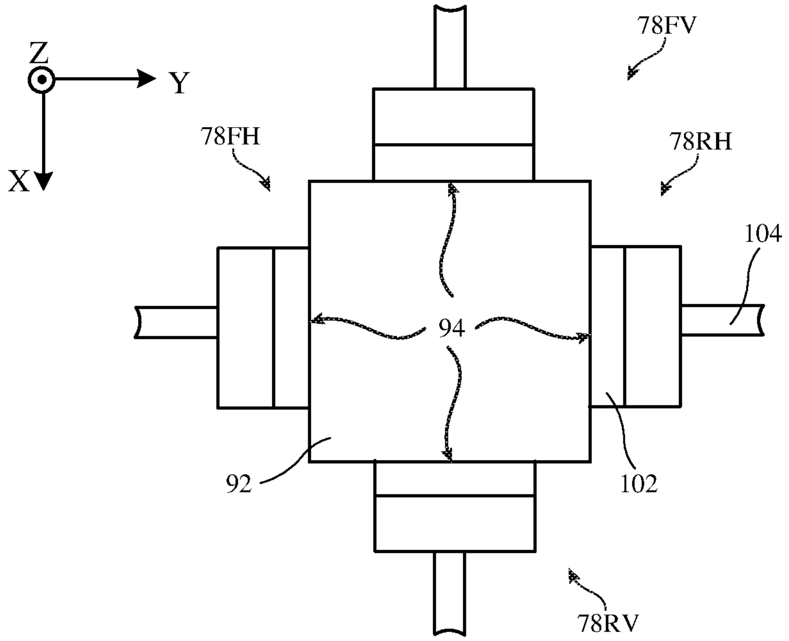
FIG. 11 is a top view showing how an illustrative dielectric resonating element may be fed using horizontally and vertically polarized feed probes for a front-facing dielectric resonator antenna and using horizontally and vertically polarized feed probe for a rear-facing dielectric resonator antenna in accordance with some embodiments.

FIG. 11 is a top-down view of dielectric resonating element 92 in an example where the front-facing and rear-facing antennas each convey radio-frequency signals using orthogonal linear polarizations. As shown in FIG. 11, the front-facing antenna may be fed using feed probes 78FH and 78FV whereas the rear-facing antenna is fed using feed probes 78RV and 78RH. Feed probes 78FH and 78FV may be mounted to orthogonal sidewalls 94 of dielectric resonating element 92. Feed probes 78RV and 78FV may be mounted to opposing sidewalls 94 of dielectric resonating element 92. Feed probes 78RH and 78FH may be mounted to opposing sidewalls 94 of dielectric resonating element 92. Feed probes 78RV and 78RH may be mounted to orthogonal sidewalls 94 of dielectric resonating element 92. In this way, feed probe 78FV may convey vertically-polarized radio-frequency signals for the front-facing antenna, feed probe 78RV may convey vertically-polarized radio-frequency signals for the rear-facing antenna, feed probe 78FH may convey horizontally-polarized radio-frequency signals for the front-facing antenna, and feed probe 78RH may convey horizontally-polarized radio-frequency signals for the rear-facing antenna. The example of FIG. 11 is merely illustrative. If desired, feed probe 78RV may be coupled to the same sidewall 94 as feed probe 78FV and/or feed probe 78RH may be coupled to the same sidewall 94 as feed probe 78FH.

Figure 12:
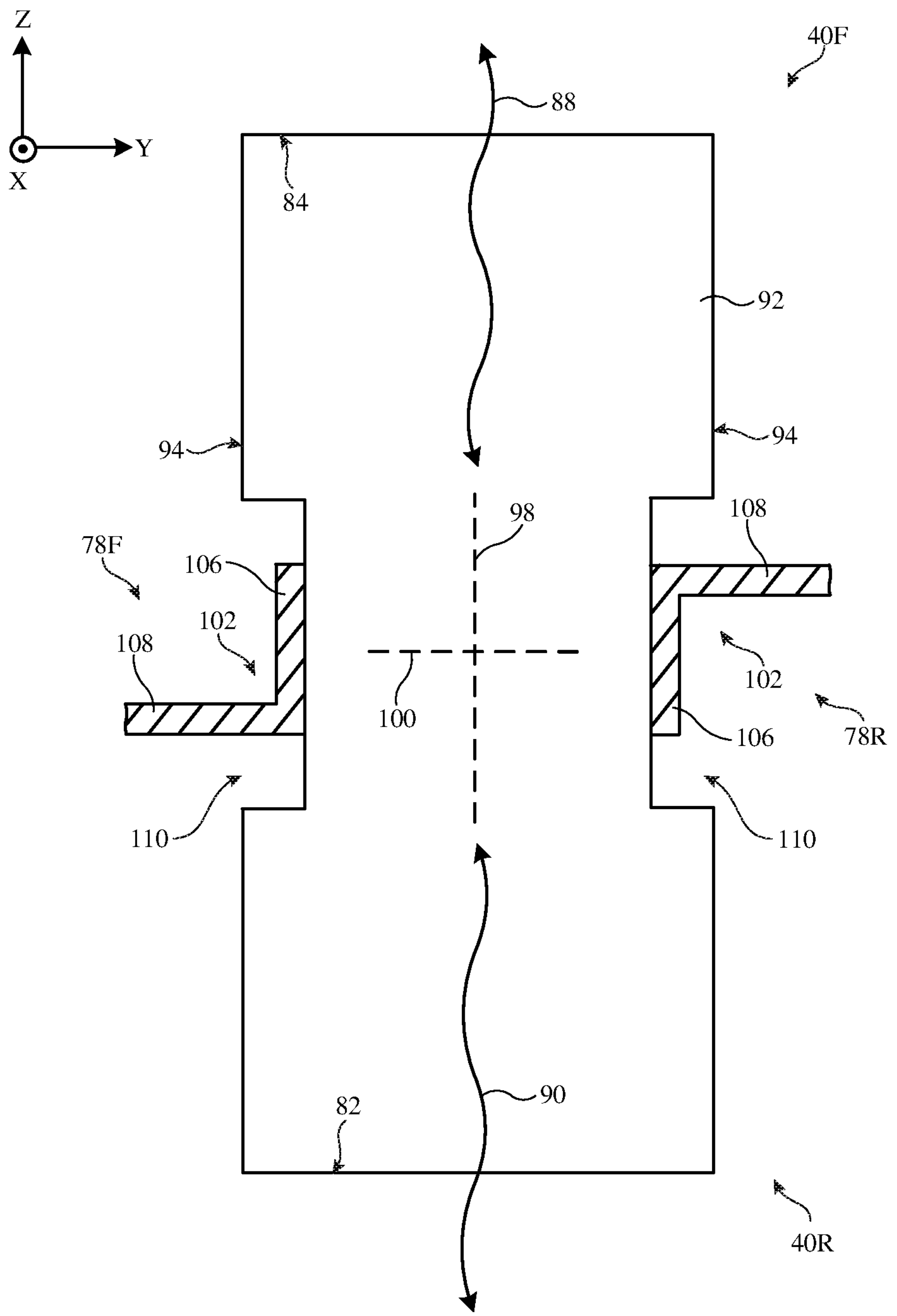
FIG. 12 is a cross-sectional side view of an illustrative dielectric resonating element having a notch that accommodates a first feed probe for a front-facing dielectric resonator antenna and a second feed probe for a rear-facing dielectric resonator antenna in accordance with some embodiments.

FIG. 12 is a cross-sectional side view showing one example of how feed probes 78F and 78R may feed respective portions of dielectric resonating element 92 (e.g., for front-facing antenna 40F and rear-facing antenna 40R, respectively). As shown in FIG. 12, feed probe 78F for front-facing antenna 40F may contact a first sidewall 94 of dielectric resonating element 92. Feed probe 78R for rear-facing antenna 40R may contact a second sidewall 94 of dielectric resonating element 92 opposite the first sidewall 94. Feed probes 78F and 78R may be used to form feed probes 78FH and 78RH of FIG. 11, respectively, or may be used to form feed probes 78FV and 78FV of FIG. 11, respectively, in scenarios where antennas 40F and 40R cover multiple polarizations.

If desired, notches such as notches 110 may be formed in sidewalls 94 at or around central axis 100. The geometry of notches 110 may help to isolate the electromagnetic modes of dielectric resonating element 92 used to propagate radio-frequency signals 88 for front-facing antenna 40F from the electromagnetic modes of dielectric resonating element 92 used to propagate radio-frequency signals 90 for rear-facing antenna 40R. If desired, feed probes 78F and 78R may each be coupled to dielectric resonating element 92 within notches 110 (e.g., feed probes 78F and 78R may be mounted within notches 110).

In order to further isolate front-facing antenna 40F from rear-facing antenna 40R, feed probes 78F and 78R may be mounted to dielectric resonating element 92 with opposing (e.g., inverted or flipped) orientations. In the example of FIG. 12, the feed conductor 102 for feed probe 78F is an L-shaped feed conductor having a first portion 106 in contact with dielectric resonating element 92 and a second portion 108 extending away from first portion 106. Second portion 108 may be coupled to a given conductive interconnect structure 80 on printed circuit 74 (FIG. 6). Similarly, the feed conductor 102 for feed probe 78R is an L-shaped feed conductor having a first portion 106 in contact with dielectric resonating element 92 and a second 108 extending away from first portion 106. The feed conductors 102 of FIG. 12 may be formed from pieces of sheet metal that are folded into an L-shape, for example. Because feed probes 78F and 78R have opposite orientations, the second portion 108 of feed probe 78F and the second portion 108 of feed probe 78R are located on opposing sides of central axis 100. This may configure feed probe 78R to more easily excite the electromagnetic modes of dielectric resonating element 92 between central axis 100 and bottom surface 82 (for propagating radio-frequency signals 90) and may configure feed probe 78F to more easily excite the electromagnetic modes of dielectric resonating element 92 between central axis 100 and top surface 84 (for propagating radio-frequency signals 88), thereby helping to isolate front-facing antenna 40F from rear-facing antenna 40R.

The example of FIG. 12 is merely illustrative. Feed conductors 102 may have other shapes (e.g., may be folded into a T-shape or other shapes instead of an L-shape). More (e.g., all) of feed probe 78R may be located below central axis 100 than feed probe 78F and more (e.g., all) of feed probe 78F may be located above central axis 100 than feed probe 78R if desired. In implementations where feed probes 78F and 78R include conductive material patterned directly onto dielectric resonating element 92, the point on the feed conductor 102 for feed probe 78F located closest to bottom surface 82 may be coupled to printed circuit 74 whereas the point on the feed conductor 102 for feed probe 78R located closest to top surface 84 may be coupled to printed circuit 74. Notches 110 may have other shapes having edges that follow any path having any desired number of curved and/or straight segments. Feed probes 78F and 78R may be coupled to sidewalls 94 outside of notches 110. If desired, feed probes 78F and 78R may be coupled to the same sidewall 94 of dielectric resonating element 92 (e.g., within notch 110 or at opposing sides of notch 110).

Figure 13:
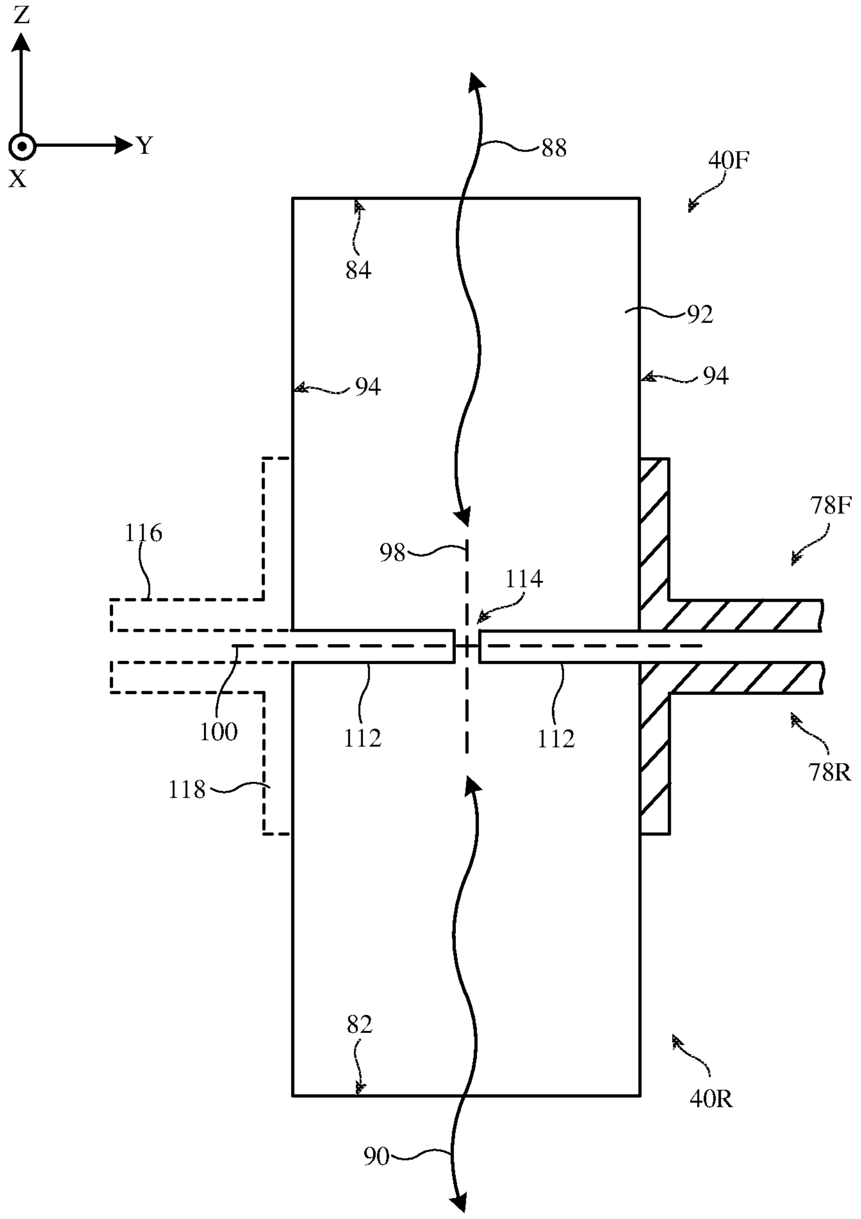
FIG. 13 is a cross-sectional side view of an illustrative dielectric resonating element having a notch that helps to electromagnetically isolate a front-facing dielectric resonator antenna from a rear-facing dielectric resonator antenna in accordance with some embodiments.

FIG. 13 is a cross-sectional side view showing one example of how feed probes 78F and 78R may be coupled to the same sidewall 94 of dielectric resonating element 92. As shown in FIG. 13, feed probes 78F and 78R may be coupled to the same sidewall 94 of dielectric resonating element 92. If desired, feed probes 78F and 78R may have inverted orientations about central axis 100 to help isolate the front-facing and rear-facing electromagnetic modes of the dielectric resonating element. When oriented in this way, the sides of feed probes 78F and 78R closest to central axis 100 may be coupled to printed circuit 74. If desired, dielectric resonating element 92 may include a notch such as notch 112 between feed probes 78F and 78R (e.g., at or extending through central axis 100) to help further isolate the front and rear-facing antennas. If desired, notch 112 may extend around all sides of dielectric resonating element 92 (e.g., running within the X-Y plane around longitudinal axis 98, leaving only central portion 114 connecting the portion of dielectric resonating element 92 above central axis 100 from the portion of dielectric resonating element 92 below central axis 100).

The example of FIG. 13 is merely illustrative. Notch 112 may have other shapes (e.g., shapes having edges that follow any path having any desired number of curved and/or straight segments). Feed probes 78F and 78R may have other shapes (e.g., may be formed from sheet metal folded in a T-shape, may be formed from conductive traces patterned directly onto sidewall 94, etc.). Notch 112 may be omitted. If desired, feed probe 78F may be mounted to the sidewall 94 opposite to feed probe 78R (e.g., at location 116). If desired, feed probe 78R may be mounted to the sidewall 94 opposite to feed probe 78F (e.g., at location 118). Notch 112 may be filled with dielectric material if desired (e.g., portions of dielectric overmold 86 of FIG. 6).

Sidewalls 94 may have other shapes. If desired, the same feed probe may be used to feed both the front and rear-facing antennas (e.g., where the feed probe is positioned at a particular location on the dielectric resonating element and has a particular shape that, when combined with the geometry of the dielectric resonating element, the feed probe excites separate front and rear-facing electromagnetic modes of the dielectric resonating element to allow the front and rear-facing antennas to be independently operated).

Figure 14:
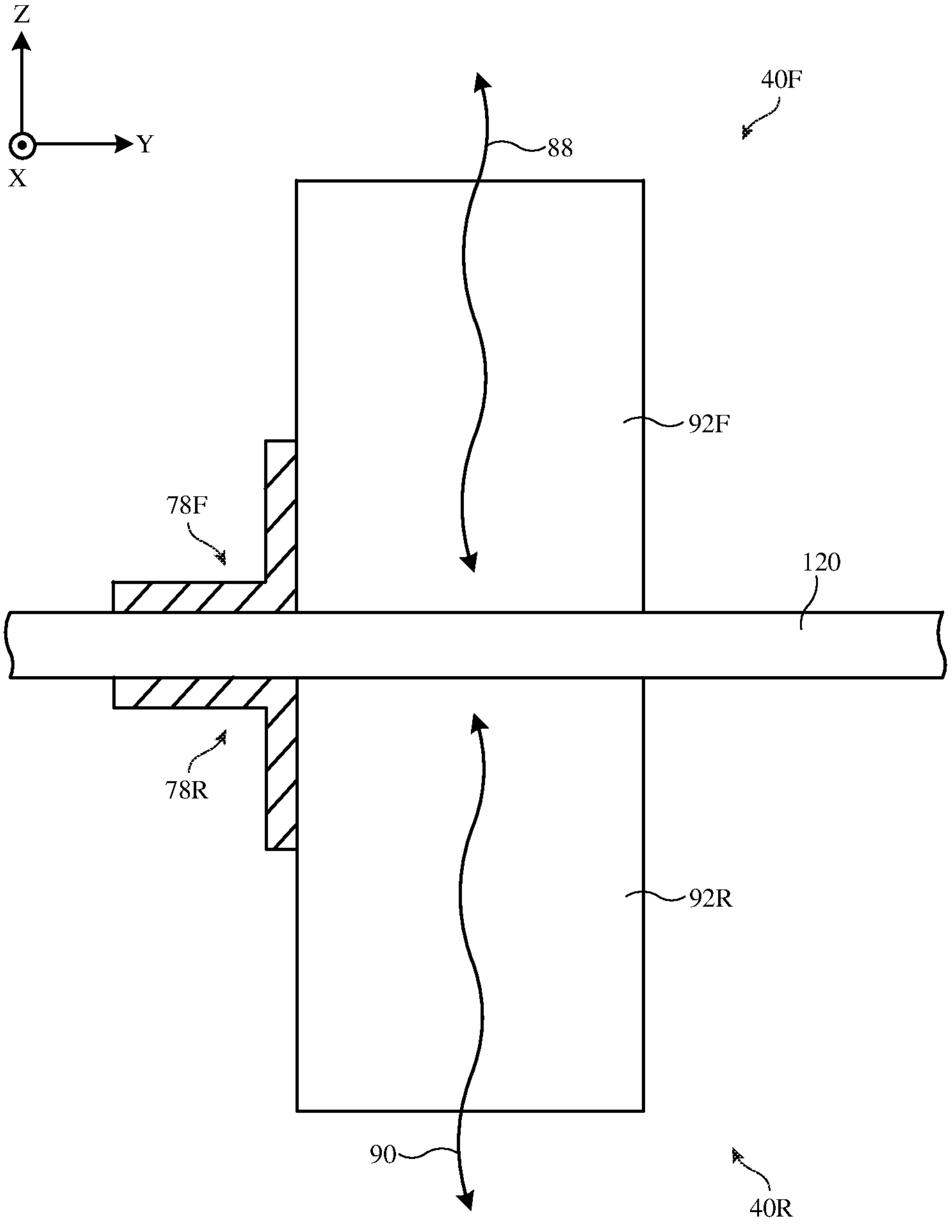
FIG. 14 is a cross-sectional side view of front-facing and rear-facing dielectric resonator antennas formed from respective dielectric resonating elements mounted to opposing sides of an interposer in accordance with some embodiments.

The examples of FIGS. 6-13 in which antennas 40F and 40R are formed from the same dielectric resonating element are merely illustrative. If desired, antennas 40F and 40R may be formed from respective dielectric resonating elements separated by an interposer substrate, as shown in the example of FIG. 14. As shown in FIG. 14, front-facing antenna 40F may include a front-facing dielectric resonating element 92F and rear-facing antenna 40R may include a rear-facing dielectric resonating element 92R. Dielectric resonating elements 92R and 92F may be mounted to opposing sides of an interposer substrate such as substrate 120. Dielectric resonating element 92F may be fed using a feed probe 78F at a first side of substrate 120. Dielectric resonating element 92R may be fed using a feed probe 78R at a second side of substrate 120. Substrate 120 may help to isolate front-facing antenna 40F from rear-facing antenna 40R.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a dielectric overmold;

a dielectric resonating element embedded in the dielectric overmold, wherein the dielectric resonating element has a longitudinal axis, a first surface at a first end of the longitudinal axis, a second surface at the second end of the longitudinal axis, and sidewalls extending orthogonally from the first surface to the second surface, and at least a portion of the sidewalls is covered by the dielectric overmold;

a first feed probe coupled to a first location on the sidewalls, wherein the first feed probe is configured to excite a first volume of the dielectric resonating element extending from the first location to the first end to radiate, through the first end, at frequencies greater than 10 GHZ, and at least a portion of the first feed probe is covered by the dielectric overmold;

a second feed probe coupled to a second location on the sidewalls that is interposed between the first location on the sidewalls and the second end of the dielectric resonating element, wherein the second feed probe is configured to excite a second volume of the dielectric resonating element extending from the second location to the second end to radiate, through the second end, at frequencies greater than 10 GHZ, and at least a portion of the second feed probe is covered by the dielectric overmold; and a notch in the sidewalls between the first location on the sidewalls and the second location on the sidewalls.

2. The electronic device of claim 1, wherein the notch in the sidewalls is one of a plurality of notches in the sidewalls between the first location on the sidewalls and the second location on the sidewalls.

3. The electronic device of claim 1, wherein the notch in the sidewalls extends around all the sidewalls of the dielectric resonating element.

* * * * *